United States Patent
Dykstra

(10) Patent No.: US 8,893,428 B2
(45) Date of Patent: Nov. 25, 2014

(54) SYSTEM FOR TRAPPING INSECTS

(75) Inventor: Thomas M. Dykstra, Gainesville, FL (US)

(73) Assignee: Technology S.G., L.P., Wayne, PA (US)

( * ) Notice: Subject to any disclaimer, the term of this patent is extended or adjusted under 35 U.S.C. 154(b) by 1265 days.

(21) Appl. No.: 10/354,067

(22) Filed: Jan. 30, 2003

(65) Prior Publication Data

US 2003/0151006 A1 Aug. 14, 2003

Related U.S. Application Data

(60) Provisional application No. 60/354,946, filed on Feb. 11, 2002.

(51) Int. Cl.
*A01M 5/00* (2006.01)
*A01M 1/00* (2006.01)
*G01J 5/04* (2006.01)
*A01M 23/00* (2006.01)
*A01M 1/02* (2006.01)
*A01M 1/14* (2006.01)

(52) U.S. Cl.
CPC ............... *A01M 1/023* (2013.01); *A01M 1/14* (2013.01); *A01M 1/02* (2013.01)
USPC ............... 43/120; 120/58; 120/65; 120/107; 120/132.1; 250/526

(58) Field of Classification Search
USPC ......... 250/493.1, 494.1, 495.1, 503.1, 504 R, 250/505.1, 517.1; 43/107–122, 58, 65, 131, 43/132.1, 133, 136
See application file for complete search history.

(56) References Cited

U.S. PATENT DOCUMENTS

| | | | |
|---|---|---|---|
| 524,437 A | 8/1894 | Hayden | |
| 1,249,753 A | 12/1917 | Higgins | |
| 3,653,145 A * | 4/1972 | Stout | 43/131 |
| 3,666,169 A * | 5/1972 | Eaton | 232/43.2 |
| 3,708,908 A * | 1/1973 | Levey | 43/114 |
| 3,947,985 A * | 4/1976 | Skrzypczak | 40/473 |
| 3,997,785 A | 12/1976 | Callahan | |
| 4,089,132 A * | 5/1978 | McLaughlin | 43/136 |
| 4,282,673 A | 8/1981 | Focks et al. | |
| 4,400,903 A * | 8/1983 | Seidenberger | 43/122 |

(Continued)

FOREIGN PATENT DOCUMENTS

WO WO 98/10643 3/1998

OTHER PUBLICATIONS

Doolittle et al., "A Low Cost, NIST-Traceable, High-Performance Dielectric Resonator Master Oscillator", Proc. 1999 Particle Accelerator Conf., NY 1999, pp. 7687770.*

(Continued)

*Primary Examiner* — Bernard E Souw
(74) *Attorney, Agent, or Firm* — Sterne, Kessler, Goldstein & Fox PLLC

(57) ABSTRACT

An insect trap is described. The insect trap includes a container that has solid walls defining a substantially rectangular or spherical closed space. The container has a hole. The container has at least two parallel walls in the rectangular embodiment. The two parallel walls or the spherical walls are at least partially covered with a reflective surface on the inside of the container. A semiochemical or an odorant is situated in said container. A permeable flap covers the hole.

26 Claims, 5 Drawing Sheets

(56) References Cited

U.S. PATENT DOCUMENTS

| | | | |
|---|---|---|---|
| 4,440,321 A * | 4/1984 | Campbell et al. | 222/153.01 |
| 4,442,624 A * | 4/1984 | Browne | 43/107 |
| 4,472,904 A * | 9/1984 | Wasielewski | 43/81 |
| 4,505,065 A * | 3/1985 | Niemeyer | 43/107 |
| 4,577,434 A * | 3/1986 | Davis | 43/115 |
| 4,606,768 A * | 8/1986 | Svilar et al. | 75/246 |
| 4,669,237 A * | 6/1987 | Constantine | 52/101 |
| 4,998,376 A * | 3/1991 | Scherjbak | 43/61 |
| 5,050,336 A * | 9/1991 | Paassen | 43/61 |
| 5,133,150 A * | 7/1992 | Briese | 43/122 |
| 5,247,933 A | 9/1993 | Callahan et al. | |
| 5,323,556 A * | 6/1994 | Carle | 43/139 |
| 5,365,690 A * | 11/1994 | Nelson et al. | 43/113 |
| 5,424,551 A | 6/1995 | Callahan | |
| 5,449,376 A | 9/1995 | Callahan | |
| 5,505,017 A * | 4/1996 | Nelson et al. | 43/113 |
| 5,528,049 A | 6/1996 | Callahan | |
| 5,557,341 A * | 9/1996 | Weiss et al. | 348/699 |
| 5,572,825 A * | 11/1996 | Gehret | 43/114 |
| 5,622,617 A * | 4/1997 | Tsusaka et al. | 210/85 |
| 5,766,617 A | 6/1998 | Heath et al. | |
| 5,896,695 A * | 4/1999 | Walker | 43/107 |
| 5,915,948 A * | 6/1999 | Kunze et al. | 43/114 |
| 5,921,018 A | 7/1999 | Hirose et al. | |
| 5,974,726 A * | 11/1999 | Creeger et al. | 43/107 |
| 5,974,727 A * | 11/1999 | Gilbert | 43/113 |
| 6,112,452 A * | 9/2000 | Campbell | 43/107 |
| 6,301,827 B1 * | 10/2001 | Lankster | 43/107 |
| 6,401,384 B1 * | 6/2002 | Contadini et al. | 43/132.1 |
| 6,493,986 B1 * | 12/2002 | Nelson et al. | 43/113 |
| 6,516,558 B1 * | 2/2003 | Lingren et al. | 43/107 |
| 6,546,667 B1 * | 4/2003 | Carter | 43/107 |
| 6,662,464 B2 * | 12/2003 | Treu | 34/85 |
| 6,708,443 B2 * | 3/2004 | Hall | 43/107 |
| 6,722,080 B2 * | 4/2004 | Carter | 43/107 |
| 6,871,443 B2 * | 3/2005 | Lambert et al. | 43/113 |
| 6,959,510 B1 * | 11/2005 | Nelson et al. | 43/113 |
| 7,086,569 B2 * | 8/2006 | Stravitz | 222/157 |
| 2001/0042337 A1 * | 11/2001 | Lambert et al. | 43/113 |
| 2002/0032980 A1 * | 3/2002 | Nelson | 43/113 |
| 2003/0089023 A1 * | 5/2003 | Nelson et al. | 43/113 |
| 2003/0151006 A1 * | 8/2003 | Dykstra | 250/493.1 |
| 2003/0154644 A1 * | 8/2003 | Lambert et al. | 43/107 |
| 2006/0218851 A1 * | 10/2006 | Weiss et al. | 43/113 |
| 2007/0068068 A1 * | 3/2007 | Weiss et al. | 43/132.1 |

OTHER PUBLICATIONS

Krupka et al., "A dielectric resonator for measurtements of complex permittivity of low loss dielectric materials as a function of temperature", Meas. Sci. Technol. 9 (1998), 1751-1756.*
Trbojevic et al., "Resonant cavity enhanced photodetectors for LWIR atmospheric window: Resonator Design", X Telecomm. Forum Telfor'2002, Belgrade, Nov. 26-28, 2002, pp. 1-4.*
Ji et al., "A High-Q Millimeter-Wave Dielectric-Resonator Bandpass Filter Using Whispering-Gallery Modes", TMO progress Report 42-141, May 15, 2000, pp. 1-11.*
Long et al., Mutual Coupling between Cylindrical, Probe-Fed Dielectric Resonator Antennas, http://www.isso.uh.edu/publications/A9900/mini-long.htm.*
Feng et al., "Low-Noise Dielectric Resonator Oscillator", http://courses.ece.uiuc.edu/ece345/cgi-bin/view_project.pl?/spring2001_8.*
National Scientific Corp., "Dielectric resonator", http://www.nsclocators.com/images/pdf/IP_Resonator.PDF.*
Institute of Physics, "New Microwave Dielectric Resonator Materials for Wireless Coomunication", http://www.iop.org/news/544.*
Kishk et al., Univ. Mississippi, "Dielectric resonator Antenna", http://www.ee.olemiss.edu/researchbriefs/dielectric.asp.*
Barry Carter, "ORMUS and Quantum Evolution", http://www.subtleenergies.com/ormus/tw/evolutionj.htm.*
Barry Carter, "Homeopathic Resonances and ORMUS", http://www.subtleenergies.com/ormus/homeopat.htm.*
Flint et al., "Understanding Semiochemicals . . . ", http://ipmworld.umn.edu/chapters/flint.htm.*
CIBRA—Insects Bioacoustics, http://www.unipv.it/cibra/insec.html.*
Exosect, "A New Approach to Non-Pesticidal Insect Pest Control in Food Crops".*
The MISTRA Project, http://www.kep.mh.se/orgchem/scpests.html.*
Tuned Circuit of Nikola tesla, wysiwyg://97/http://www.geocities.com/scitek21/TunedCircuits.html.*
Leal et al., "Identification, Synthesis, and Field Evaluationof the Sex Pheromone of the Citrus Fruit Borer", J. Che. Ecology 27 (10), 2001, pp. 2041-2051.*
J. Grossman, "Building a Better Moth Trap", http://www.worldandlibrary.com.*
Purdue University, "Physics 3452 Laboratory" manual, http://www.physics.purdue.edu/~sergei/classes/phys342I/diffraction.doc.*
Pyrometer technology, http://www.pyrometercom/Tech/blackbodytech.html.*
"Tunable Diode Laser Absorption Spectroscopy", http://www.asp.ucar.edu/colloquium/1992/notes/part2/node9.html.*
B. Carter, ORMUS/Callahan/Studies on Resonance vs Gravity, http://soulinvitation.com/ormus.*
E.-K. Souw, Plasma density measurement in an imperfect microwave cavity, J. Appl. Phys. 61 (5) 1987, pp. 1761-1772.*
Mompart et al., "Lasing without inversion", J. Opt. B: Quantum Semiclass. Opt. 2, 2000, R7-R24.*
IUPAC Compendium, "Excitation and Radiation Spectra", http://www.iupac.org/publications/analytical_compendium/cha10sec311.pdf.*
Laser Componenets, "Uncoated Substartes", http://www.lasercomponents.de/wwwe/faq/optmat.htm.*
LBL, "Infrared Window Materials", http://infrared.als.lbl.gov/IRwindows.html.*
Umicore, "Infrared transmitting Glass", http://www.optics.umicore.com/am4/docs/pdf/tdsirg_01.pdf.*
Σigma_Metrics, "Statistics in Biology and Medicine", <http://www.sigmametrics.co.uk/statbiol.htm>.*
Edmund Optics, "EO Mirror Reflectance", from <http://www.edmundoptics.com/techSupport/DisplayArticle.cfm?articleid=259>.*
Wolfram Research, "Standard Deviation", <http://mathworld.wolfram.com/StandardDeviation.html>.*
Wolfram Research, "Normal Distribution", <http://mathworld.wolfram.com/NormalDistribution.html>.*
J.W. Goodman (1958), "Statistical Optics", J. Wiley & Sons, New York etc.*
University of Yale, "Confidence Intervals", <http://www.stat.yale.edu/Courses/1997-1998/101/confint.htm>.*
Rice University, "Confidence Interval for the Mean", <http://psych.rice.edu/online_stat/chapter8/mean.html>.*
University of Hamburg, "The Analysis of Quantitative Data", <http://ww.biologie.uni-hamburg.de/b-online/e13/13b.htm>.*
Hofstra University, "Confidence Intervals—Miscellaneous on-line topics for Finite Mathematics", <http://people.hofstra.edu/faculty/Stefan_Waner/RealWorld/finitetopic1/confint.html>.*
Neuroscience/LifeScience/Neuroinformatics, "Data Analysis and Statistics Tutorial", <http://www.dns.ed.ac.uk/~rrr?MscNeuroStats2002.htm>.*
Digital Communications, "Statistical Confidence Levels for Estimating BER Probability", <http://www.maxim-ic.com/appnotes.cfm/appnote_number/703>.*
Marine Geology, "Data Analysis", <http://marine.geol.sc.edu/BIOL/Courses/BIOL301/Lab/Manual/Data_Analysis.html>.*
Extra Lesson Plan: "Stellar Fingerprints: The Spectra of Stars", Absorption/Emission Spectra for Hydrogen, ☐☐<http://www.pbs.org/newshour/extra/teachers/lessonplans/science/hubble_overheadB.pdf>.*
Merriam-Webster OnLine <http://www.m-w.com/cgi-bin/dictionary?book=Dictionary&va=absorbance>.*
Everything Bio <http://www.everythingbio.com/glos/definition.php?word=absorbance+optics>.*

(56) References Cited

OTHER PUBLICATIONS

"null.pdf" Null Hypothesis (Aug. 22, 2008) http://davidmlane.com/hyperstat/A72117.html.*

"sigtest.pdf" Tests of Significance (1997-1998) http://www.stat.yale.edu/Courses/1997-98/101/sigtest.htm.*

"Statistical_significance.pdf" Statistical Significance From Wikipedia, the free encyclopedia (Jul. 16, 2010) http://en.wikipedia.org/wiki/Statistical_significance.*

"gaussian.pdf" Gaussian, Error and Complementary Error function (1998) http://ecee.colorado.edu/~bart/book/gaussian.htm.*

"Fitting_Gauss.pdf" Fitting a Gaussian distribution to a frequency distribution (2007) http://www.graphpad.com/help/prism5/stat_fitting_a_gaussian_dstributio.htm.*

"spss2.pdf" The Normal Frequency Distribution (2009) http://www.microbioloybytes.com/maths/spss2.html.*

Università degli Studi di Pavia, Centro Interdisciplinare di Bioacustica e Ricerche Ambientali, "Insects—Sound produced by insects" [online], [retrieved on Nov. 13, 2001]. Retrieved from the Internet: <URL: http://www.unipv.it/cibra/insec.html> (6 pages).

Lewis, J.R., *College Chemistry*, Ninth Edition, Barnes & Nobles Books, pp. 11 and 24.

Goldwasser, S.M., *Sam's Laser FAQ—Helium-Neon Lasers*, from http://www.laserfaq.org/slf/laserhen.htm (retrieved on Mar. 18, 2004),127 pages, (Copyright 1994-2003).

Becker, G., "Communication between Termites by Means of Biofields and the Influence of Magnetic and Electric Fields on Termites," in Popp, F.A. et al. (eds)., *Electromagnetic Bio-Information*, Urban & Schwarzenberg, pp. 116-127 (1989).

Search Report for International Application No. PCT/US03/04104, issued on Jul. 17, 2003.

Bruce, W.A., "Perception of Infrared Radiation by the Spiny Rat Mite *Laelaps echidnia* (Acari: Laelapidae)," *Annals of the Entomological Society of America*, pp. 925-931 (1971).

Callahan, P.S., "Far Infrared Stimulation of Insects with the Glagolewa-Arkadiewa 'Mass Radiator'," *The Florida Entomologist*, vol. 54, No. 2, pp. 201-204 (1971).

Callahan, P.S. et al., "Attraction of Ants to Narrow-Band (Maser-Like) Far-Infrared Radiation as Evidence for an Insect Infrared Communication System," *Physiol. Chem. & Physics* 14, pp. 139-144 (1982).

Evans, W.G., "Perception of Infrared Radiation from Forest Fires by *Melanophila Acuminata* De Geer (Buprestidae, Coleoptera)," *Ecology*, vol. 47, No. 6, pp. 1061-1065 (1966).

Blomquist, G.J. and Vogt, R.G. (eds.), *Insect Pheremone Biochemistry and Molecular Biology*, pp. 393, 396, 501, 517 and 594 (2003).

Evans, W.G., "Morphology of the Infrared Sense Organs of *Melanophila Acuminate* (Buprestiae: Coleoptera)," *Annals of the Entomological Society of America*, vol. 59, No. 5, pp. 873-877 (1966).

Popp, F. A., "Coherent Photon Storage of Biological Systems," in Popp, F.A. et al. (eds.), *Electromagnetic Bio-Information*, pp. 144-167 (1989).

Wamke, U., "Information Transmission by Means of Electrical Biofields," in Popp, F.A. et al. (eds.), *Electromagnetic Bio-Information*, pp. 74-101 (1989).

* cited by examiner

SYSTEM FOR TRAPPING INSECTS

BACKGROUND OF THE INVENTION

1. Field of the Invention

The present invention is directed to trapping insects.

2. Background Art

Stored grain is transported all over the world by ship, truck, and plane. The distribution of grain is dependent on short to long-term storage ranging from a few days to more than a year. The long-term storage of grain has encouraged the exponential growth of many insects and other pests that infest stored grain. Augmentation of pest populations are facilitated by the virtually unlimited food source found in storage grain bins or warehouses. Estimated losses caused by pests in temperate climates approximates 10-15%, but in tropical countries, the figure can be as high as 60%.

In less severe cases, healthy insect infestations, while not directly consuming the grain in bulk, greatly reduce grain marketability simply by their presence. Insect body parts or residues that can be found in storage grain samples thus create financial hardship for many farmers. On a national scale, this monetary figure runs into the hundreds of millions of dollars.

Farmers and industry have turned to chemical management in an effort to reduce the pest populations found in stored grain. The chemicals are either sprayed directly on the grain as it is being placed into the storage grain bin or warehouse storage area, or the same may be fumigated with a registered fumigant once the grain is placed in semi-permanent storage. The fumigant of choice for many years has been methyl bromide. However, methyl bromide is being phased out to comply with environmental regulations. Replacements for methyl bromide nonetheless are currently chemical in nature.

Several problems are associated with the chemical management of pest infested stored grains. These problems include chemical residues being left on grain destined for human or animal consumption, accidental human exposure to fumigants resulting in death or sickness, corrosive damage to sensitive equipment such as computers, and the potentially high financial costs of fumigation, most especially at ports. These are serious problems that all present and future fumigation companies must address.

An alternative to chemical management is the use of insect traps that contain naturally attractive molecules called pheromones. Typically, these molecules are released into the atmosphere by individual insects and are used by insects to locate a mate. For this reason, these particular molecules are called insect sex pheromones. When pheromones were first synthetically produced in the 1960s, many believed they would solve pest management problems since sex pheromones were considered to provide an irresistible and highly specific attractant to many of the most common insect pests. Unfortunately, the sex pheromone traps did not meet their expectations. Because they attract so few insects, these traps have been downgraded from insect management devices to merely insect monitoring devices.

Current sex pheromone traps have many limitations. One limitation includes the relatively small number of insects trapped over a given period of time. There are no reliable figures to specify the percentage of insects that can be successively trapped in a given area. However, years of research wholly supports that the traps are ineffective at significantly reducing insect populations in a storage grain bin or warehouse unless the traps are used in very high densities.

A second limitation is the reduced longevity of the pheromone source or lure in conventional traps. The longevity of the pheromone lure is estimated to be approximately six weeks based on anecdotal information in the industry. A third limitation involves the mechanism used by these pheromone traps to capture and retain the insects. A sticky card is a common mechanism used to hold and retain the insects once they enter the pheromone trap. However since pheromone traps are often placed in dusty environments, a sticky card can become useless after only a few days, which is unfortunately long before the pheromone lure will lose its effectiveness.

An exemplary insect trap is described in U.S. Pat. No. 3,997,785 to Callahan (herein referred to as the '785 patent), which is incorporated herein by reference as though set forth in its entirety. This trap functions by vibrating a gold coated needle in a molecular scent vapor. Although it provides advantages over other conventional solutions, this trap did not perfectly mimic the frequencies produced by the target insect. Improvements were made and described in U.S. Pat. No. 5,424,551 to Callahan (herein referred to as the '551 patent), which is incorporated herein by reference as though set forth in its entirety. Despite the advantages this trap has over other conventional solutions, this trap has been determined to attract insects at a distance of only four to five centimeters.

Consequently, a system and method are needed to solve the above-identified problems and provide an efficient solution for controlling insects and other pests without the harmful side-effects of chemical management.

BRIEF SUMMARY OF THE INVENTION

The system and method of present invention overcome the problems of conventional pest control systems by providing a partially enclosed, resonant cavity that naturally attracts and traps pest populations.

One or more target lures are introduced into a reflective cavity. In an embodiment, the target lure is a substrate that has been impregnated with a particular semiochemical (e.g., insect sex pheromones). The lure is positioned inside of the cavity. Within the cavity, the semiochemical disperses into the local atmosphere and releases and absorbs electromagnetic radiation according to environmental conditions. The reflective cavity may be referred to as a "resonant cavity" as it is believed to facilitate the release of electromagnetic radiation emitted from the semiochemical.

The resonant cavity is substantially closed to prevent easy escape of the semiochemical or any radiation emitted from the semiochemical. The radiation is permitted to reflect within the resonant cavity. The present invention operates without the need of pumping radiation or active air flow. Therefore, the semiochemical diffuses throughout the resonant cavity according to physical laws. Eventually, the semiochemical escapes through a small aperture to attract and trap the target pest.

In an embodiment, parallel reflecting plates are provided to help contain the semiochemical and reflect any radiation present in the cavity. As described, pumping radiation is not required to amplify or modulate the radiation. The target lure allows for the escape of its impregnated semiochemical molecules into the resonant cavity for a certain period of time which is referred to as the incubation period. Thus, the resonant cavity is substantially closed to allow the semiochemical to remain inside the resonant cavity during its incubation period. It is believed that this action allows the concentration of the semiochemical to increase and reach a critical level. Upon reaching the critical level, the semiochemical and its radiation passively escape from the trap.

In another embodiment, a source of pumping radiation is provided as an additional attractant. Additionally or alternatively, the pumping radiation can be situated to enhance the passive amplification. However the present invention is functional in absence of pumping radiation.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Figure 1:
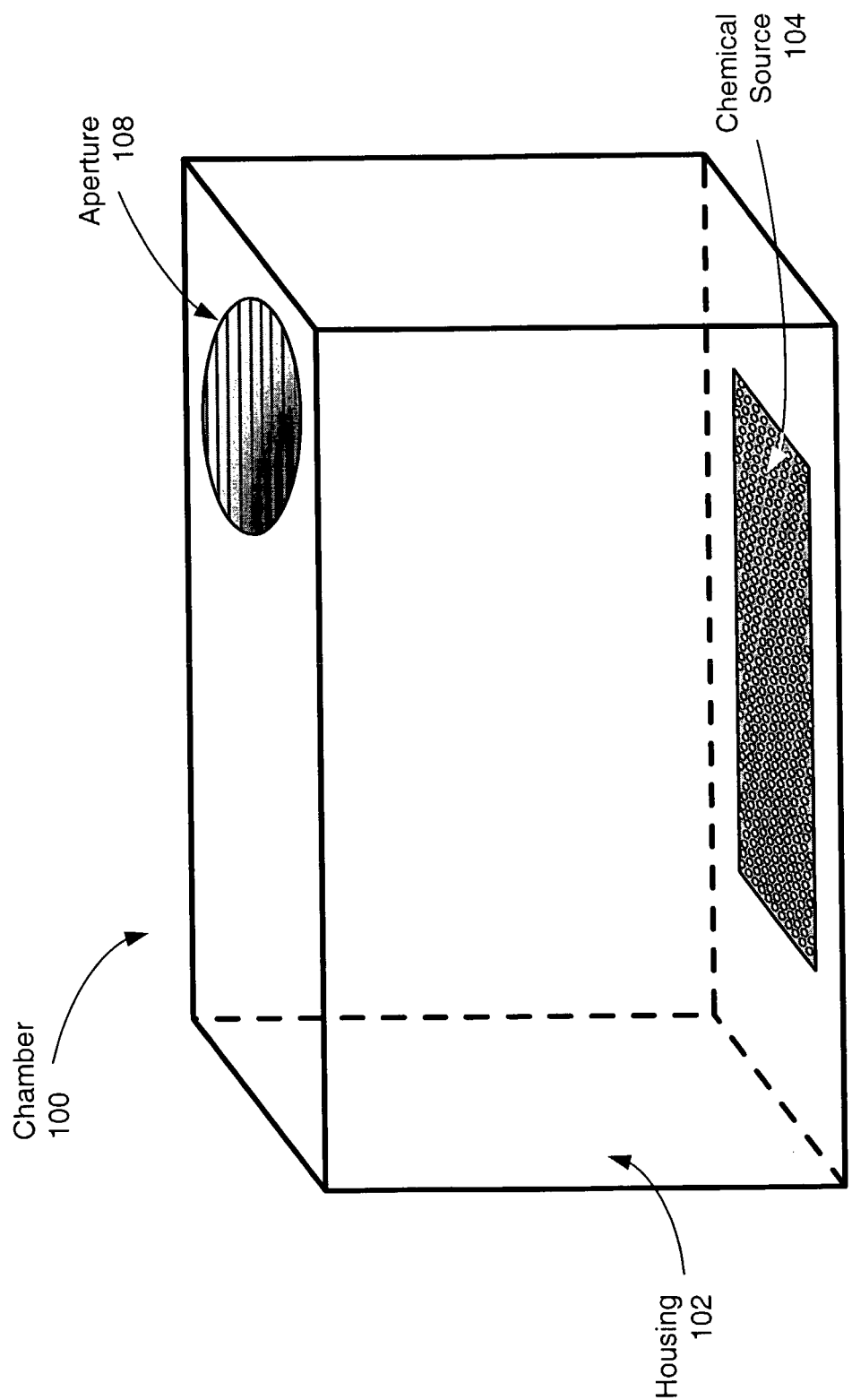
FIG. 1 illustrates a pest control chamber according to an embodiment of the present invention.
Figure 2:
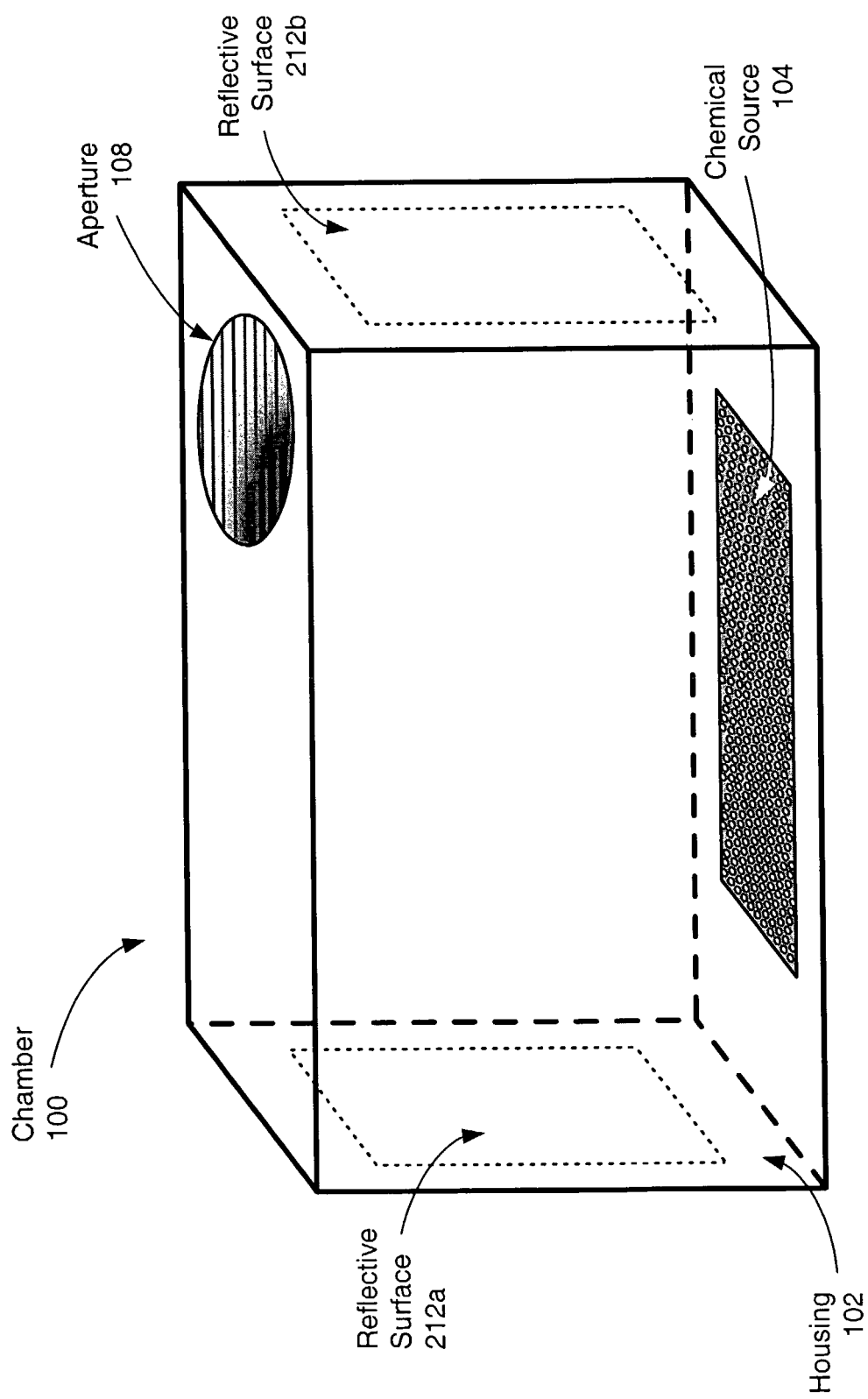
FIG. 2 illustrates a pest control chamber according to another embodiment of the present invention.
Figure 3:
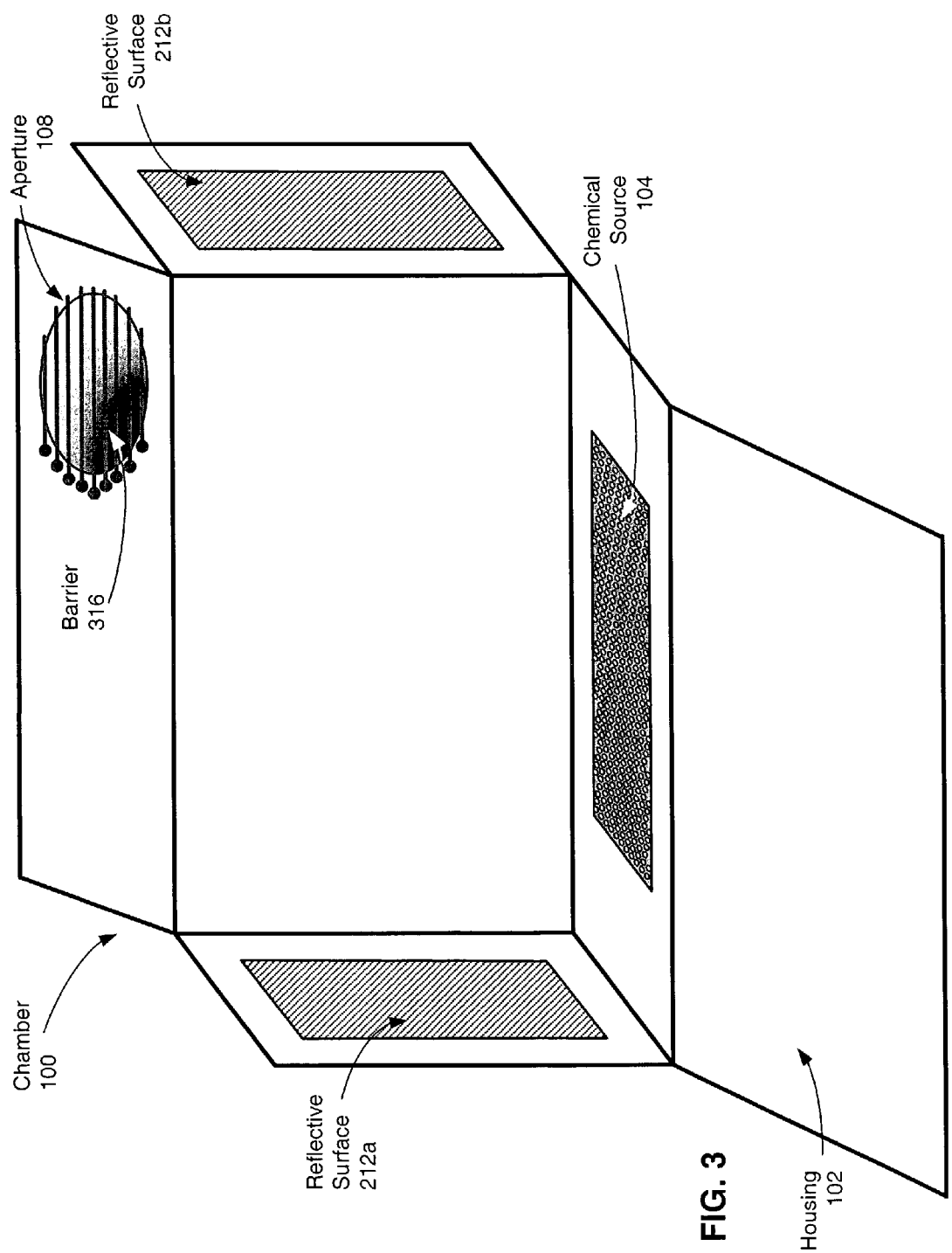
FIG. 3 illustrates an exploded view of the chamber of FIG. 2.

The present invention provides a method and system for attracting and trapping various pests without the use of harmful pesticides and similar chemicals. Alternatively, the present invention can be used to repel pests. It is believed that the present invention functions better than other insect traps because olfaction in animals (for example, insects) is based on electromagnetic signals emanating from molecules.

The prevalent theory regarding olfaction is the "lock and key hypothesis." This hypothesis is taught in virtually all high schools and universities, and states that a given molecule fits into a biological receptor. This binding to the receptor can be either permanent or semi-permanent in nature. Once the molecule binds with the receptor, a nervous impulse propagates down the axonal region of a neuron, if not several neurons, where the impulse is eventually received by an appropriate decoder, such as the brain.

An alternative hypothesis concerning olfaction, specifically in insects, has been presented in a series of papers published by both Robert H. Wright and Philip S. Callahan. Working independently, they began publishing their ideas in the 1950s. Their hypotheses, although not identical, suggest olfaction is based on electromagnetic signals emanating from molecules. They suggest that the electromagnetic signature of molecular emissions causes an olfactory response in insects. Based on this hypothesis, the manipulation of molecular emissions will theoretically affect olfaction. It is believed that manipulation of electromagnetic frequencies differentiates the present invention from conventional insect traps presently on the market, resulting in more effective capturing of insects than offered by conventional insect traps.

The present invention uses a partially enclosed cavity that may reflect electromagnetic radiation emitted from molecules diffusing from a target lure. The partially enclosed cavity of the present invention is similar to the systems of the '785 patent and the '551 patent. However, these systems describe a contained system, or perfectly sealed cavity for amplifying emissions from target molecules, such as insect sex pheromones. Other important distinctions exist between the present invention and these former patents, and these distinctions are discussed in greater detail below.

In an embodiment, the target lure contains one or more semiochemicals that attract the target pest. Conventionally, a semiochemical includes any secretory substance that regulates behavior in members of the same or different species. A semiochemical can be a pheromone, such as an insect sex pheromone, that solicits a certain reaction among members of the same species. However, the present invention includes other substances that can be used in lieu of, or in combination with, a semiochemical to attract a target pest. These substances include, but are not limited to, garlic scent, perfume, deodorant, air freshener, similar molecules, infrared coded emissions from any system that controls or effects living organisms (such as, drugs, pharmaceuticals, etc.), or the like. Depending on whether the present invention is being used as an attractant or repellant, the target lure can also contain one or more semiochemicals or other substances that repel the target pest. Hence, as used herein, the term "semiochemical" refers to conventional semiochemicals, other substances as mentioned above, or both.

In the present invention, the ambient conditions are sufficient to permit the target lure to naturally disperse its semiochemical within the partially enclosed cavity. It is believed that electromagnetic radiation released from the semiochemical propagates within the cavity which may increase the activity level of the molecules, ions, or atoms comprising the semiochemical. It is this heightened physical activity level which is believed to result in increased biological attraction exhibited from the target pests. The present invention is believed to allow a sufficient degree of amplification which is more similar to that found under natural conditions. It is believed that the amplified electromagnetic radiation and/or the more highly active semiochemical is allowed to passively escape from the cavity. Therefore, it is believed that the present invention allows for the amplification of semiochemical radiation within the resonant cavity. Eventually targeted pests are lured into the cavity where they become permanently trapped.

FIG. 1 illustrates a pest control chamber 100 according to an embodiment of the present invention. Chamber 100 is configured to provide a resonant cavity. It is believed that this cavity facilitates the natural production of coherent and/or semi-coherent electromagnetic radiation. It is believed that the radiation is released into the atmosphere via highly active semiochemicals at a frequency level that serves as an attractant or repellant to insects or like pests, depending on the selected semiochemical(s).

Chamber 100 includes a housing 102, a chemical source 104, and an aperture 108. The surrounding housing 102 can be produced from a variety of natural or synthetic materials, including metals, non-metals, and/or alloys. In an embodiment, housing 102 consists of a wood product. In another embodiment, housing 102 is produced from granite, quartz, or other forms of rock. For example, housing 102 can be a smooth laminated and/or polished granite surface. Other suitable materials can be plastic, cardboard, and glass. Housing 102 can be any suitable material or combination of materials as long as the material is capable of preventing the semiochemical, or electromagnetic radiation from the semiochemical, from penetrating the walls of housing 102.

Housing 102 is shaped as a parallelogram, having a top, bottom, and four sides. However, housing 102 is not restricted to a parallelogram or other straight sided shapes. Housing 102 can form any type of geometric shape, including without limitation, cylindrical, spherical, parabolical, and/or conical shapes, a combination of various shapes, and the like.

Chemical source 104 and aperture 108 are strategically located to produce a desired control signal that is released from aperture 108. As discussed, the control signal can be either the semiochemical (believed to be in an amplified activity state), radiation from the semiochemical, or both. Chemical source 104 represents the target lure. In an embodiment, chemical source 104 is a substrate having a semiochemical applied to the substrate surface. In another embodiment, chemical source 104 is a plurality of substrates having a semiochemical deposited onto each substrate. Each substrate can use the same or a different semiochemical. Different types of semiochemicals can be used to either increase the likelihood of attracting a particular pest, or enable chamber 100 to be effective in attracting a variety of pests.

In another embodiment of chemical source 104, the semiochemical is applied directly to the inner surface of housing 102, instead of being deposited onto a substrate. In another embodiment, chemical source 104 is an external unit connected to an opening or vent formed within housing 102. The semiochemical is stored in the external unit, and dispersed through the opening or vent into chamber 100. Other mechanisms, methodologies, and techniques can be employed to introduce semiochemicals into chamber 100, and are deemed to be within the scope of the present invention.

Within chamber 100, the semiochemical disperses from chemical source 104 and releases electromagnetic radiation. The radiation from one molecule (or, atom or ion, depending on the selected semiochemical) may stimulate emissions from other molecules according to natural laws. Unlike the systems described in the '785 patent and the '551 patent, air flow or pumping radiation is not required to amplify stimulated emissions. In the present invention, the semiochemical is not at first directly exposed to the atmosphere or its wind currents. For this reason, the longevity of the semiochemical in chamber 100 is much greater than it would be in conventional insect pheromone traps. Laboratory research by the inventor reveals that an insect pheromone lure in the present invention remains effective for at least one and a half years, which is up to fourteen times longer than the effective life of a pheromone lure in a conventional insect pheromone trap.

Once dispersed, the semiochemical remains inside and "resonates" within chamber 100 for a certain period of time, referred to as the incubation period. Upon conclusion of the incubation period, the control signal passively diffuses through aperture 108. As discussed above, the control signal can be either the semiochemical, radiation from the semiochemical, or both. In an embodiment, aperture 108 is a circular opening in the top side of housing 102. The diameter of aperture 108 is one-quarter inch, but may be varied to adjust for the size of the pest, and/or modulate semiochemical concentration, target frequencies, or the like. Although aperture 108 is illustrated as being circular, aperture 108 can form other geometric shapes, or can be located at other positions, such as the side of chamber 100, so long as the control signal is allowed to escape into the surrounding environment.

It is believed that the incubation period for the semiochemical is sufficient to allow adequate reflection of the energy of the semiochemical in the resonant cavity. This time period is achieved by substantially enclosing chamber 100 to produce the resonant cavity, thus preventing the easy escape of the semiochemical. As shown in FIG. 1, chamber 100 is almost completely enclosed except for the opening provided by aperture 108. In other embodiments, the shape and walls of chamber 100 can be structured to provide more openings so long as the semiochemical is allowed to remain inside for the incubation period.

Accordingly, various factors influence the requisite incubation period. The incubation period is a function of the shape, volume, surface area, or dimensional characteristics of chamber 100. The incubation can be influenced by the material used to form housing 100. The incubation period can also vary due to the size, shape, location, or quantity of openings, including aperture 108, as well as the permeability of aperture 108, discussed in greater details below.

The present invention does not use wind currents as described for the systems of the '785 patent and the '551 patent. Although an active wind response can be created by, for example, one or more moths fluttering their wings once trapped inside the resonant cavity, this wind response is not dependent on any inherent or active properties of chamber 100, itself. At an appropriate time, the control signal emanates from aperture 108 into the surrounding environment. Upon making contact with the control signal, each target pest follows the concentration gradient of the control signal to its source.

Chamber 100 can be tuned to different pests, and serves as an attractant or repellant, depending on the objectives of the user. This can be achieved by changing the type of semiochemical or increasing the concentration or density of the semiochemical dispersed within chamber 100. It is believed that chamber 100 can also be tuned by altering the shape and/or dimensions of housing 102. Additionally, the incubation period can be adjusted which, it is believed, sets the desired amplification of the target electromagnetic frequencies. As discussed above, the dimensions of aperture 108 or chamber 100 can be varied to alter the desired concentration levels or frequencies.

As described above, it is believed that passive amplification is achieved by emissions naturally resonating within chamber 100. Various resonating mechanisms can be provided to promote this activity. In FIG. 1, electromagnetic radiation propagates between the walls of housing 102. FIG. 2 provides another embodiment of chamber 100 that includes two parallel reflective surfaces 212*a*-212*b*. Reflective surfaces 212*a*-212*b* promote natural resonance between these parallel components. Reflective surfaces 212*a*-212*b* can be a mirror or like material that prevents the radiation from penetrating the components and escaping.

In an embodiment, reflective surfaces 212*a*-212*b* are formed into or serve as the walls of housing 102. In another embodiment, reflective surfaces 212*a*-212*b* can fully or partially cover the inside walls of housing 102. In an embodiment, if reflective surfaces 212*a*-212*b* are mirrors, the thickness can approximate 0.35 cm. However, since a mirror is reflective only on its back side, the reflection of the electromagnetic radiation inside the cavity of chamber 100 should not be seriously altered due to the thickness of reflective surfaces 212*a*-212*b*. For example, if the length of the resonate cavity within chamber 100 is 13.8 cm. Having a mirror on both ends would decrease the actual length by "0.35 cm×2," or 0.70 cm. Thus the length, adjusted for the mirrors, is 13.1 cm. However, since the mirrored surface is only on the back of a mirror, the actual reflection of electromagnetic radiation should still be reflected within a 13.8 cm cavity, so long as the radiation can freely pass through the glass structure of the mirror.

FIG. 3 shows an exploded view of chamber 100 of FIG. 2. FIG. 3 also shows an embodiment of a permeable barrier 316 for aperture 108. Barrier 316 is attached or formed to the inside of chamber 100, and covers aperture 108. Nonetheless, barrier 316 is sufficiently permeable to allow the control signal to escape. In an embodiment, barrier 316 is also configured to permit a target pest to enter aperture 108, but prevent the target pest from escaping. For example aperture 108 is sized to permit an insect, such as a moth, to enter chamber 100. After entering chamber 100, barrier 316 is structured to prevent the moth from escaping. Aperture 108 should be sufficiently unobstructed from both sides to allow the pest to enter chamber 100.

In an embodiment, barrier 316 is a series of four to six brush-like bristles that are attached to the inside of the top wall of housing 102. The bristles completely span aperture 108, and slightly overlap the opposite side. All bristles are attached at the same end, but left free to move at the opposite end. This allows the bristles to bend inwards, but not outwards because they are obstructed by the top wall of housing 102. Bristles are resilient to return to their natural positions after bending inwards.

In another embodiment, the bristles are attached at different ends as opposed to being attached at the same end. Alternatively, the bristles can be attached at both ends. Other configurations can be used so long as the target pest is allowed to enter chamber 100, but prevented from escaping.

In an embodiment, aperture 108 is one-quarter inch in diameter and has at least four brush-like bristles, all equally spaced, spanning the hole. The length of the bristles averages 1.5 centimeters or three-quarters of an inch so as to allow them to bend slightly. The bristles should be reasonably thick, much thicker than a human hair, for purposes of durability and to prevent escape of the pest, such as a moth.

Another embodiment of barrier 316 is a resilient flap or like structure that permits a pest to enter chamber 100. However, the flap must return to its original position to block the pest from exiting. In an embodiment, the flap may be attached to a springing mechanism that causes the flap to return to its original position. As discussed, the flap must be sufficiently permeable to permit the electromagnetic radiation and/or target lure to escape.

In an embodiment, multiple apertures 108 are strategically formed into housing 102. Each aperture 108 is configured to release a control signal and/or allow a target pest to enter, but not escape. In another embodiment, chamber 100 has at least two differently configured apertures 108. A first aperture 108 is configured to release the control signal, but is sized or has a permeable barrier to prevent a pest from entering or escaping. A second aperture 108 is provided to allow entry by the target pest. A permeable barrier 316 is integrated with the second aperture 108 to provide one-way entry.

Figure 4:
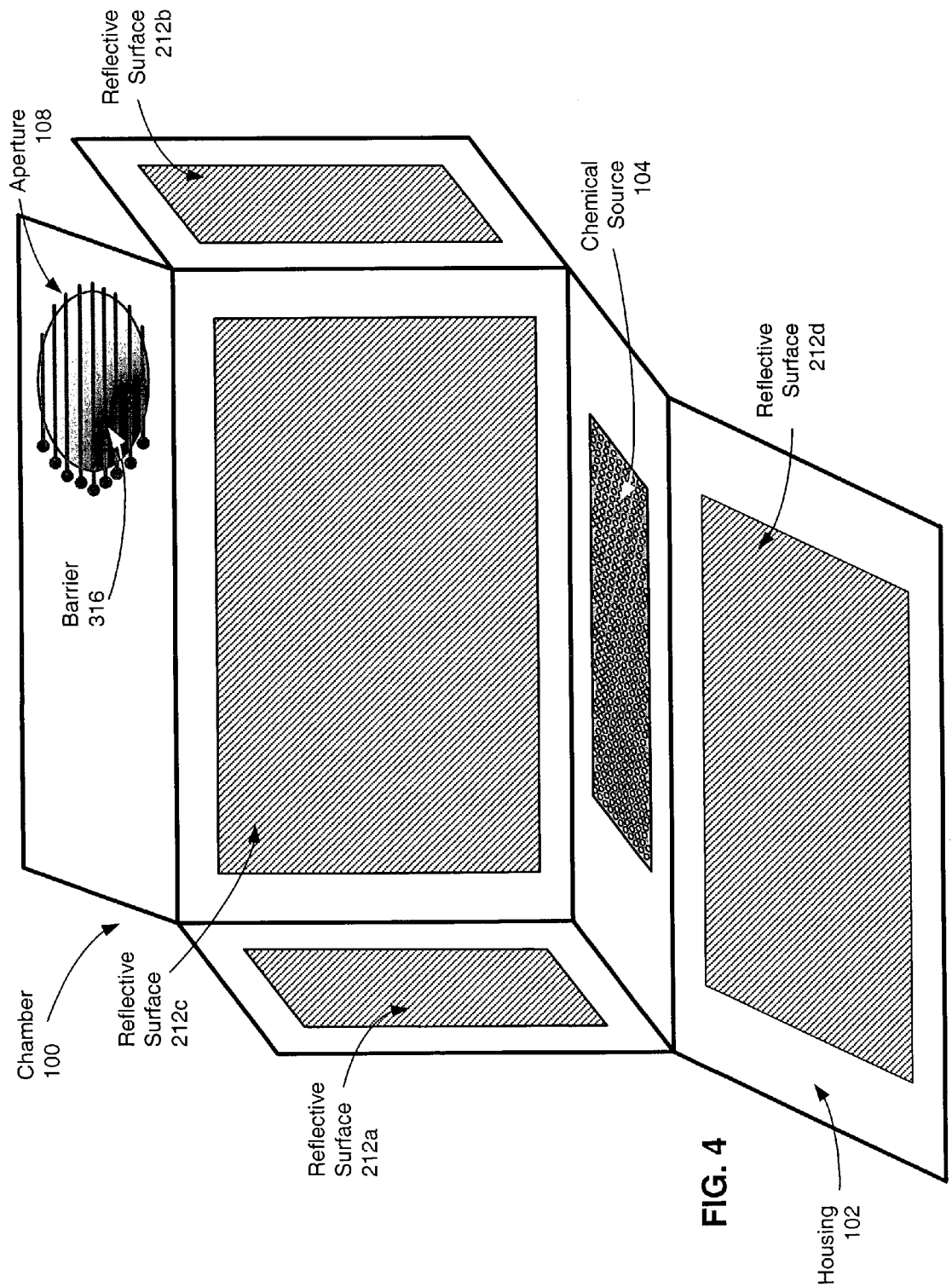
FIG. 4 illustrates an exploded view of a pest control chamber according to another embodiment of the present invention.

FIG. 4 shows another embodiment of chamber 100 having two sets of parallel reflective surfaces 212a-212b and 212c-212d. Reflective surfaces 212c-212d can partially or fully cover the inside of chamber 100 or actually form the walls of housing 102.

Figure 5:
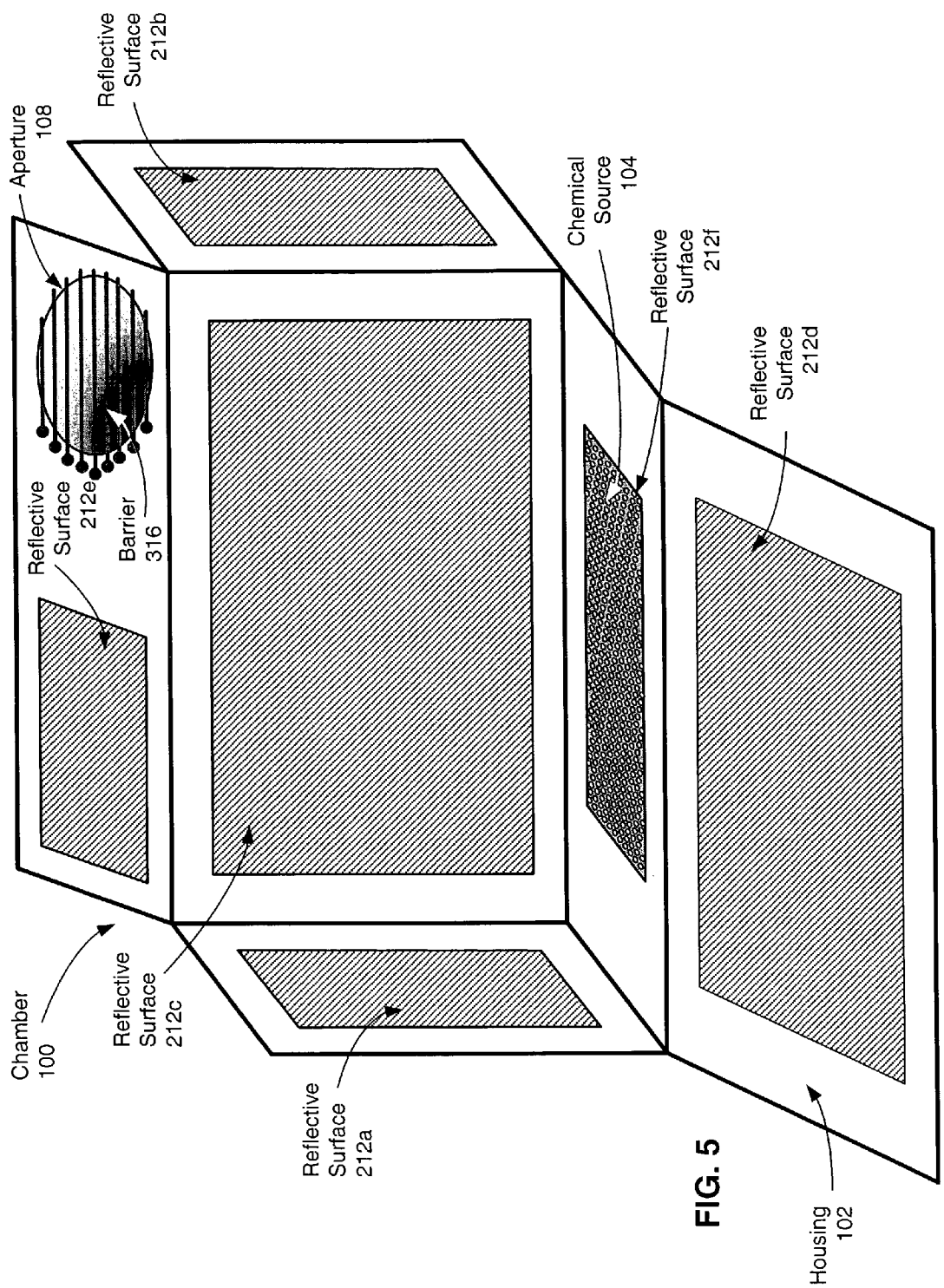
FIG. 5 illustrates an exploded view of a pest control chamber according to another embodiment of the present invention.

FIG. 5 shows another embodiment of chamber 100 with a reflective surface 212e positioned on the top of housing 102. Reflective surface 212e can fully or partially cover the top or actually be provided as the top of housing 102. Similarly, reflective surface 212f is provided on the bottom of housing 102. In an embodiment, reflective surface 212f is either applied to or formed as the bottom of housing 102. In another embodiment, as shown, reflective surface 212f is the base of chemical source 104, whereby the semiochemical is deposited directly onto reflective surface 212f. In yet another embodiment, reflective surface 212e can be provided in absence of reflective surface 212f, and vice versa. Accordingly, the inside walls of chamber 100 of the present invention can be partially or fully covered with reflective surfaces 212a-212f, or can be composed of reflective surfaces 212a-212f.

Since the present invention is believed to function by achieving passive amplification and passive diffusion, the semiochemical should be allowed to resonate within chamber 100 for a certain incubation period. In an embodiment, pumping radiation is used to assist the amplification of stimulated emissions to reduce the incubation period.

In another embodiment, pumping radiation is provided as an additional attractant or repellant that serves to enhance the efficacy of chamber 100. The pumping radiation can include the same or other electromagnetic radiation of the electromagnetic spectrum, including, without limitation, microwaves, infrared and ultraviolet light. For example, the pumping radiation can be the same frequency as, for example, the wing beat of a moth (i.e., 30 to 70 Hz) or a fly (i.e., up to 500 Hz).

In an embodiment, pumping radiation can be provided by a black light, or incandescent or fluorescent lighting. Some species of ants have been determined to be able to distinguish between AC and DC sources. As such, an AC or DC electrical and/or electromagnetic source can be another source of pumping radiation. This phenomenon is described in "Effect of electrical fields on the red imported fire ant (Hymenoptera: Formicidae)," Environ. Entomol. 21(4):866-870, by Mackay, W. P., B. Vinson, J. Irving, S. Majdi, and C. Messer (1992).

A microchip can also be integrated with the present invention to regulate an emitter to a desired pumping radiation frequency. The proximity of power sources (such as the power source to the microchip) can also affect the efficacy of chamber 100. It has been discovered that some insects are attracted to power sources. Additionally, pumping radiation can come from sound waves, including ultrasonic waves.

A burning candle can also be used as a source of pumping radiation. A burning candle emits hydrocarbons which are the backbone structures of virtually all insect semiochemicals. Thus, the release of hydrocarbons near, or inside, chamber 100 can serve as a pumping radiation source. If the candle flickers at a certain frequency, it can serve as an attractant or repellant, depending on the pest.

Some colors, such as blue or red, have proven to provide pumping radiation that attracts certain insects. Therefore, housing 102 can be lined with a cloth or sticky substance of certain colors to providing a source of pumping radiation.

As discussed, the pumping radiation source can be located inside or outside of chamber 100. Moreover, the outside surface of housing 102 can be left bare or covered with any material or combination of materials. There can be one or more sticky surfaces placed on the outside of housing 102. A sticky substance can be used to completely cover all outside surfaces, but would make chamber 100 difficult to handle. However, placement at strategic locations outside of housing 102 may decrease the number of pests that enter the trap, and would allow the inside of housing 102 (especially the reflective surfaces 212a-212e) to remain cleaner longer. This would allow chamber 100 to last longer in the field between cleaning exercises.

In an embodiment, a sticky substance can be disposed inside of chamber 100. This would enable chamber 100 to be used without a barrier 316 that prevents the pests from exiting. In an embodiment, aperture 108 is only designed to allow the control signal to escape. Pests could enter chamber 100 through aperture 108 or a similar opening, and be trapped by the sticky substance.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. An insect trap, comprising:
   a container including solid walls defining a substantially closed space, wherein said container has a hole and at least two parallel walls, wherein said two parallel walls are at least partially covered with a reflective surface on the inside of said container, wherein a semiochemical or an odorant is situated in said container; and
   a permeable flap, wherein said hole is covered by said flap.

2. The trap of claim 1, wherein said semiochemical or said odorant is deposited onto a substrate.

3. The trap of claim 1, wherein said semiochemical or said odorant is deposited onto said reflective surface.

4. The trap of claim 1, wherein said permeable flap is formed of a plurality of bristles.

5. The trap of claim 1, wherein said container comprises at least one of wood, plastic, cardboard, granite, metal, or glass.

6. The trap of claim 1, wherein said container has a rectangular shape.

7. The trap of claim 1, wherein said reflective surface is a mirror.

8. The trap of claim 1, wherein said hole is a circle with a one-quarter inch diameter.

9. The trap of claim 1, wherein said permeable flap is positioned to prevent a pest from exiting said container upon entering said container.

10. The trap of claim 1, wherein said hole is positioned on the top of said container.

11. The trap of claim 1, wherein said permeable flap includes a plurality of bristles, each of said bristles attached to said container and spanning across said hole.

12. The trap of claim 11, wherein a fixed end of each of said bristles is permanently attached to a side of said hole and the movable end is permitted to only move inward towards the inside of the trap, wherein each of said bristles is sufficiently resilient to return said movable end to a normal position after flexing to allow a pest to enter said hole.

13. The trap of claim 11, wherein both ends of said plurality of bristles are permanently attached.

14. The trap of claim 1, wherein said reflective surface completely covers the inside of said container.

15. The trap of claim 1, wherein said container has a plurality of holes.

16. The trap of claim 1, further comprising:
    a second hole in said container, wherein said second hole includes a barrier positioned to prevent a pest from exiting said second hole upon entering said housing.

17. The trap of claim 16, wherein the dimensions of the first hole are sufficient to prevent said pest from exiting the first hole.

18. The trap of claim 16, wherein said permeable flap is adapted to prevent a pest from entering or exiting the first hole.

19. The trap of claim 1, further comprising:
    an additional source of at least one of a semiochemical or an odorant, wherein said additional source is different from the first semiochemical or odorant.

20. The trap of claim 19, wherein said additional source is situated external to said container.

21. The trap of claim 19, wherein said additional source comprises two substrates, wherein each substrate is impregnated with said at least one of a semiochemical or an odorant.

22. The trap of claim 21, wherein each substrate is impregnated with a different semiochemical or odorant.

23. The trap of claim 1, wherein said container includes at least one sticky surface placed on the outer surface of said container.

24. The trap of claim 1, wherein said container includes at least one sticky surface situated inside of said container.

25. An insect trap, comprising:
    a container including solid walls defining a substantially closed spherical space and a hole, wherein the inside of said container is at least partially covered with a reflective surface, wherein a semiochemical or an odorant is situated in said container; and
    a permeable flap, wherein said hole is covered by said flap.

26. The insect trap of claim 1, wherein the dimensions of the hole is sufficient to allow the insect to enter the container.

* * * * *

UNITED STATES PATENT AND TRADEMARK OFFICE
CERTIFICATE OF CORRECTION

| | | |
|---|---|---|
| PATENT NO. | : 8,893,428 B2 | Page 1 of 1 |
| APPLICATION NO. | : 10/354067 | |
| DATED | : November 25, 2014 | |
| INVENTOR(S) | : Thomas M. Dykstra | |

It is certified that error appears in the above-identified patent and that said Letters Patent is hereby corrected as shown below:

In the Claims

In column 9, line 12, Claim 1, replace "said two" with --said at least two--.

In column 9, line 16, Claim 1, replace "said flap" with --said permeable flap--.

In column 9, line 40, Claim 12, replace "and the" with --and a--.

In column 9, line 41, Claim 12, replace "end is" with --end of each of said bristles is--.

In column 10, line 16, Claim 18, replace "prevent a pest" with --prevent said pest--.

In column 10, line 39, Claim 25, replace "surface, wherein" with --surface, and wherein--.

In column 10, line 41, Claim 25, replace "said flap" with --said permeable flap--.

In column 10, line 43, Claim 26, replace "is sufficient" with --are sufficient--.

In column 10, line 43, Claim 26, replace "the insect" with --an insect--.

Signed and Sealed this
Sixteenth Day of June, 2015

Michelle K. Lee
*Director of the United States Patent and Trademark Office*